US012266327B2

(12) United States Patent
Efron

(10) Patent No.: US 12,266,327 B2
(45) Date of Patent: Apr. 1, 2025

(54) INSTRUMENT STAND

(71) Applicant: Paul Efron, Oro Valley, AZ (US)

(72) Inventor: Paul Efron, Oro Valley, AZ (US)

( * ) Notice: Subject to any disclaimer, the term of this patent is extended or adjusted under 35 U.S.C. 154(b) by 146 days.

(21) Appl. No.: 18/224,134

(22) Filed: Jul. 20, 2023

(65) Prior Publication Data

US 2025/0029579 A1 Jan. 23, 2025

(51) Int. Cl.
*G10G 5/00* (2006.01)

(52) U.S. Cl.
CPC .................................... *G10G 5/00* (2013.01)

(58) Field of Classification Search
CPC .................................. G10G 5/00; G10D 7/08
USPC .................................................. 248/121, 443
See application file for complete search history.

(56) References Cited

U.S. PATENT DOCUMENTS

| | | | | | |
|---|---|---|---|---|---|
| 1,464,279 | A * | 8/1923 | Hindley | F16M 11/38 | 248/167 |
| 4,205,818 | A * | 6/1980 | Lawler | G10G 5/00 | 211/85.6 |
| 4,377,268 | A * | 3/1983 | Wolford | G10G 5/00 | 248/176.1 |
| 5,029,796 | A * | 7/1991 | Schoenig | G10G 5/00 | 248/443 |
| 5,165,634 | A * | 11/1992 | Garbuzov | F16M 11/38 | 84/327 |
| 5,664,756 | A * | 9/1997 | Liao | G10G 5/00 | 248/443 |
| D389,341 | S * | 1/1998 | Danner | D6/682 | |
| D394,764 | S * | 6/1998 | Nordstrom | D6/678.4 | |
| 6,220,459 | B1 * | 4/2001 | Runyon | G10G 5/00 | 248/176.1 |
| 7,375,269 | B2 * | 5/2008 | Perkins | G10G 5/00 | 248/443 |
| 7,547,835 | B1 * | 6/2009 | Mayor | G10G 5/00 | 84/327 |
| 8,925,890 | B2 * | 1/2015 | Liaw | G10G 5/00 | 248/443 |
| 10,089,969 | B1 * | 10/2018 | Chen | G10G 5/00 | |
| 2002/0134897 | A1 * | 9/2002 | Wilfer | G10G 5/00 | 248/121 |
| 2003/0221538 | A1 * | 12/2003 | Stevens | F16M 11/22 | 84/327 |
| 2004/0237755 | A1 * | 12/2004 | Laio | G10G 5/00 | 84/327 |
| 2012/0112020 | A1 * | 5/2012 | Jones | F16M 13/00 | 29/527.1 |

(Continued)

*Primary Examiner* — Muhammad Ijaz
(74) *Attorney, Agent, or Firm* — Accelerate IP LLC

(57) ABSTRACT

An instrument stand for keeping an instrument upright that can have a bell and a keyed section, wherein the bell section can transition into the keyed section at an underside. The instrument stand can comprise a bow member can have a top shape to conform to the underside of the instrument and a bottom shape to lie flat on a surface. At least one leg can extend from the bow member in the plane of the surface. A strap can be configured to encircle the bell section separated from the bow member by a column. The strap can be coupled to the top portion of the column. The instrument stand can further comprise at least one light that can be coupled to a microcontroller and a power source wherein the at least one light can be coupled to the column or to the bell of the instrument.

22 Claims, 7 Drawing Sheets

(56) References Cited

U.S. PATENT DOCUMENTS

| | | | | |
|---|---|---|---|---|
| 2012/0133111 | A1* | 5/2012 | Schmutzer | B60B 33/0039 280/651 |
| 2013/0292524 | A1* | 11/2013 | Canivell Grifols | F16M 13/022 248/121 |
| 2014/0203151 | A1* | 7/2014 | Hennessey | G10G 5/00 248/121 |
| 2016/0027416 | A1* | 1/2016 | Hsu | G10G 5/00 248/121 |
| 2019/0066637 | A1* | 2/2019 | Ugactz | F16M 13/027 |
| 2019/0103079 | A1* | 4/2019 | Jacobson | G10G 5/00 |
| 2020/0234680 | A1* | 7/2020 | Reeder | G10G 5/00 |
| 2024/0085014 | A1* | 3/2024 | Rogers | G10D 3/00 |
| 2024/0379080 | A1* | 11/2024 | Renner | G10G 5/00 |
| 2025/0029579 | A1* | 1/2025 | Efron | G10G 5/00 |

* cited by examiner

INSTRUMENT STAND

FIELD OF THE INVENTION

The present specification relates to an instrument stand and more specifically a instrument stand that securely attaches to an instrument during play and fits into the instruments case after play, and includes a lighting system for outside of the instrument's bell.

BACKGROUND OF THE INVENTION

The complex shape of saxophones and the fact that they are covered with keys makes it difficult to put them down without concern for damaging the expensive instrument. For this reason, saxophones stand exists in the marketplace today and are used to hold saxophones upright when not in use. Saxophone players often require a reliable and stable support system for their instruments during practice sessions, performances, and storage. Traditional saxophone stands typically consist of a fixed structure that requires separate assembly and disassembly. These stands can be bulky, take up valuable space, and be an inconvenient additional item during traveling, and requires the musician to return to the location of the stand to put the instrument down. Previous attempts have been made to develop collapsible saxophone stands or stands with adjustable leg height. However, these solutions often lack stability, ease of travel, and the ability to securely attach to the instrument.

A conventional saxophone stand typically stays on the ground and is a separate system from the saxophone and can have a tripod that retracts when not in use. The saxophone stand has a neck that extends from the tripod and has a u-shaped instrument support that can go around the saxophone's bell. Other stands have an upper bracket that is supports the saxophone's bell and a lower bracket that supports the bow of the saxophone. However, these conventional saxophone stands usually are either big and bulky that require the user to fold it up when not in use and lie stationary on a surface and take up a lot of room when not in use. Additionally, the conventional stand requires the user to keep the stand separate and requires the user to go back to the stand's location to put the saxophone back down as well as being separate gear to be moved during transportation.

In addition, with the advent of new light technology individuals are putting lights anywhere to showcase the individualism and showmanship. Lights are small and bright enough that they can be seen from hundreds of yards away. During concerts, parades or other musical performances individuals use lights to light the stage or portray a message to their audience. These types of lights are usually overhead or behind the musician. However, there is a desire from musicians to add lights to their musical instruments allowing the user to customize their musical instrument and the show. The addition of a colorful lighting system to the outside of the musical instrument's bell or shell can enhance the showmanship or the musician's performance.

Therefore, there remains a need for an innovative instrument stand that overcomes these drawbacks and provides a reliable, portable, and versatile support system for a musician and the desire to add a colorful light show to the musical instrument.

BRIEF SUMMARY OF THE INVENTION

Accordingly, the present invention is a saxophone stand for keeping a saxophone upright that can have a bell and a keyed section, wherein the bell section transitions into the keyed section at an underside. The saxophone stand can comprise a bow member which can have a top shape to conform to the underside of the saxophone and a bottom shape to lie flat on a surface. The saxophone stand can have at least one leg extending from the bow member in the plane of the surface. The saxophone stand can have a strap configured to encircle the bell section separated from the bow member by a column. The bow member can have a non-slip padding or grip material to enhance stability and prevent slippage of the saxophone. The at least one leg can be removable from the bow member. The at least one leg can be removably coupled to the bow member. The at least one leg can be collapsible into the bow member.

The bow member can be constructed from a lightweight and durable material, such as aluminum, plastics or composite materials. The at least one leg can be constructed from a lightweight and durable material, such as aluminum, plastics or composite materials. The column can have a top portion and a bottom portion. The strap can be coupled to the top portion of the column. The bow member can be coupled to the bottom portion of the column. The column can be telescopic to adjust the height of the column and locked into place by spring-loaded pins, clasps, or quick-release mechanism. The at least one leg can be telescopic and slide back into itself. The column can be constructed from a lightweight and durable material, such as aluminum, plastics or composite materials. The bow member, column and at least one leg can be one piece or multiple pieces coupled together. The at least one leg can have a non-slip padding or grip material to enhance stability and prevent slippage of the saxophone. The strap can have at least one leg has a non-slip padding or grip material to grip onto the saxophone's bell section.

The instrument stand can further comprise at least one light coupled to a microcontroller and a power source wherein the at least one light can be coupled to the column or to the bell or shell of the instrument. The microprocessor and power source can be coupled to the inside the column and/or at least one leg. The lights can be coupled to the column or instrument by an adhesive, tape, or hook and look. The at least one light can be in a ring that goes over the instrument's inside surface of the bell and tied in place with straps around the outside surface of the bell. The at least one light can comprise at least one bell light and at least one column light wherein the at least one bell light can be coupled wired or wirelessly to the at least one column light. The at least one light can be shaped to correspond to the instrument's bell, and wherein the instrument can be a saxophone, trumpet, trombone, baritone, or tuba. The at least one light can be shaped to correspond to the instrument's shell wherein the instrument can be a guitar, ukulele, violin, piano, or other stringed or keyboard instruments.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and will also recite the word "function" (i.e., will state "means for performing the function of . . . , without also reciting in such phrases any structure, material or act in support of the function. Thus, even when the claims recite a "means for performing the function of molding a . . . , step for performing the function of molding a . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

Figure 1:
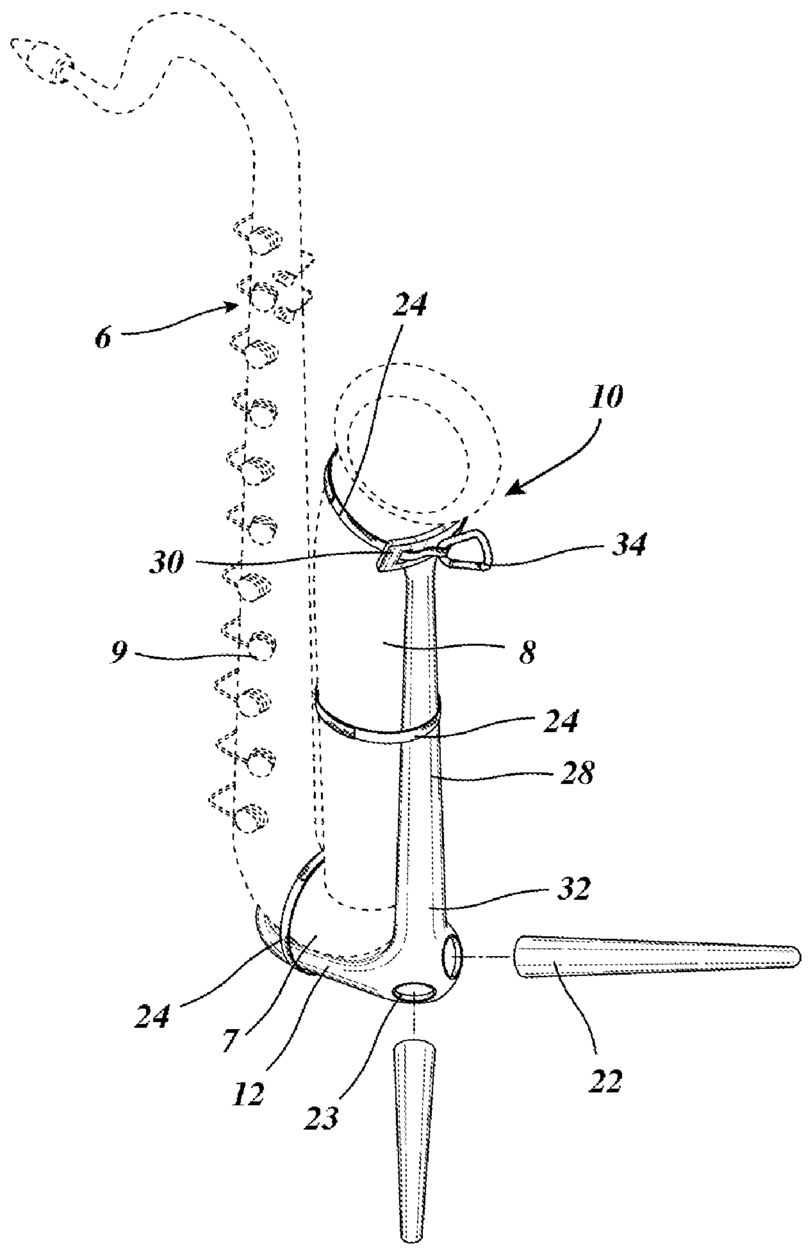
FIG. 1 is an isometric view of the instrument stand installed on a saxophone in accordance to one, or more embodiments.
Figure 2:
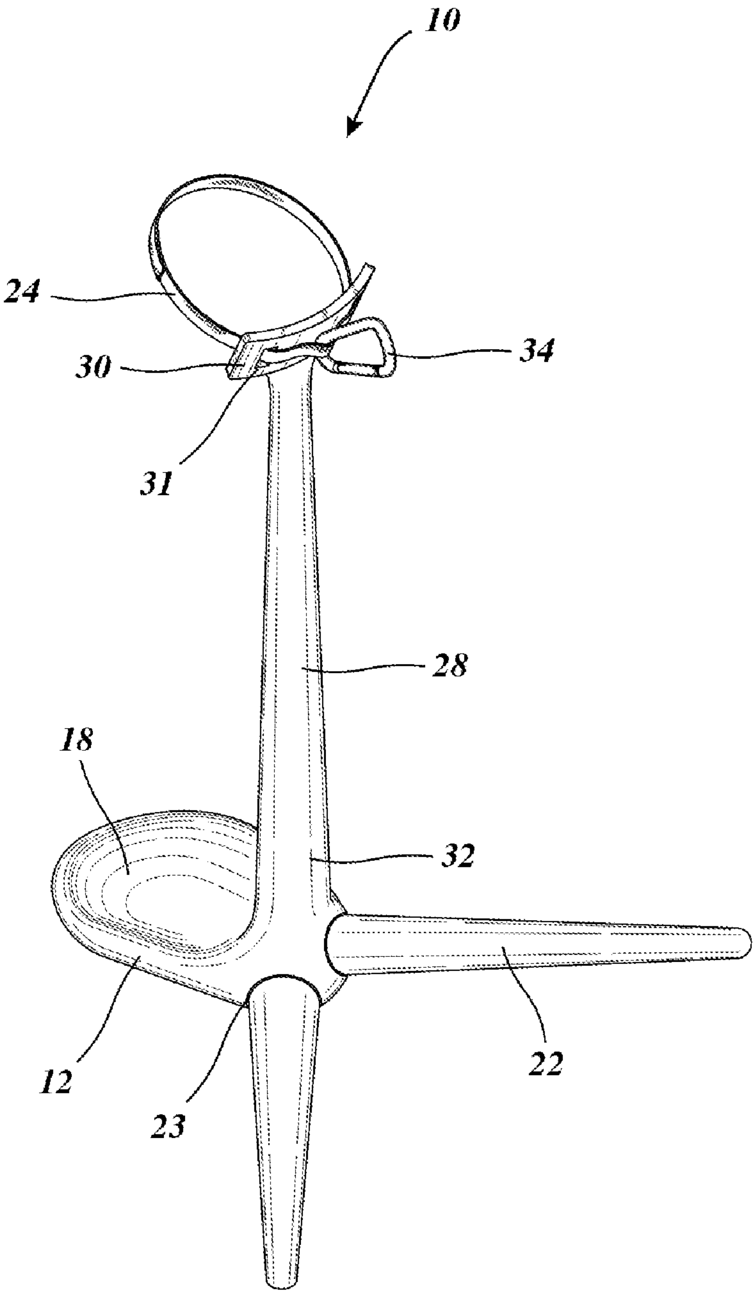
FIG. 2 is a front view of the instrument stand without the bow section attachment straps in accordance to one, or more embodiments.
Figure 3:
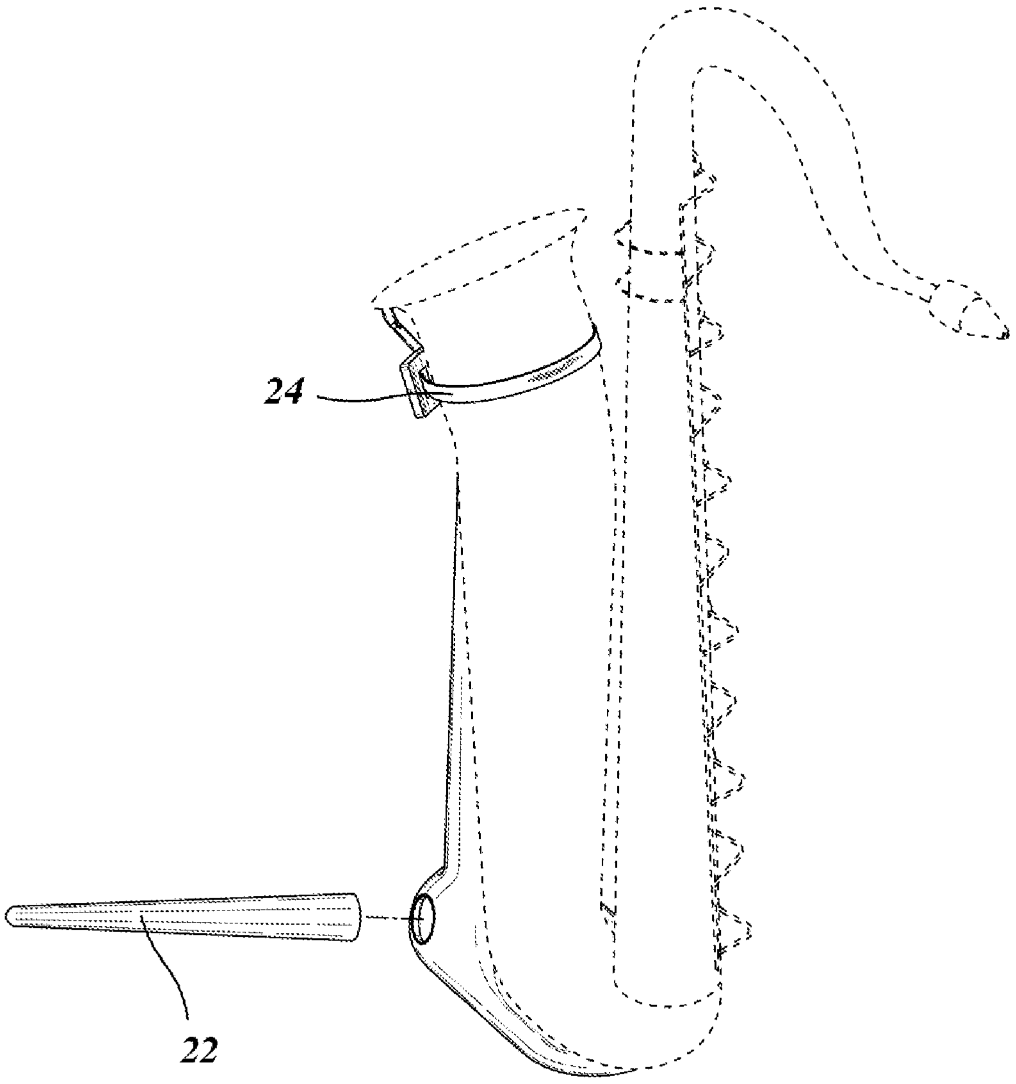
FIG. 3 is an isometric back view of the instrument stand without the bow section attachment straps in accordance to one, or more embodiments.
Figure 4:
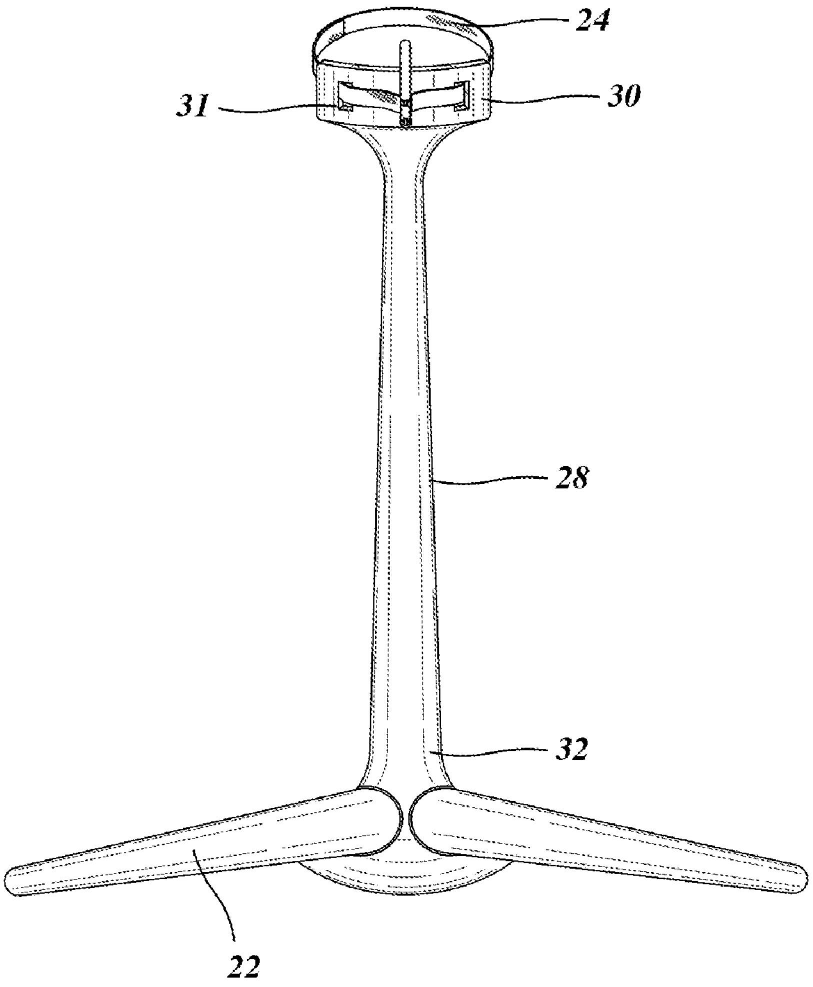
FIG. 4 is a front view of the instrument stand in accordance to one, or more embodiments.
Figure 5:
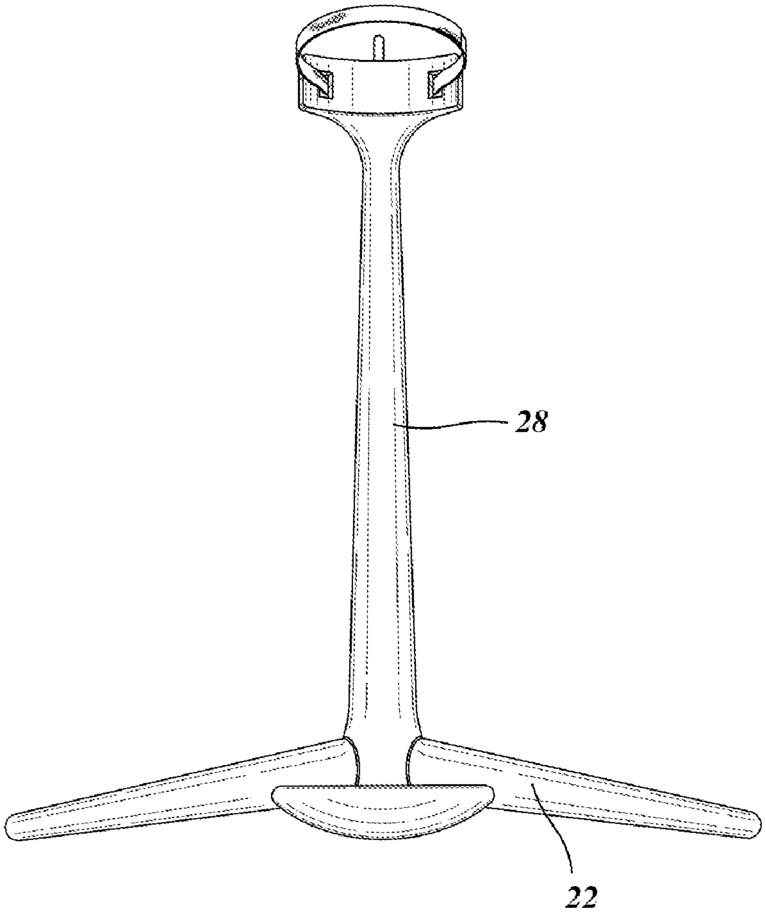
FIG. 5 is a back view of the instrument stand in accordance to one, or more embodiments.
Figure 6:
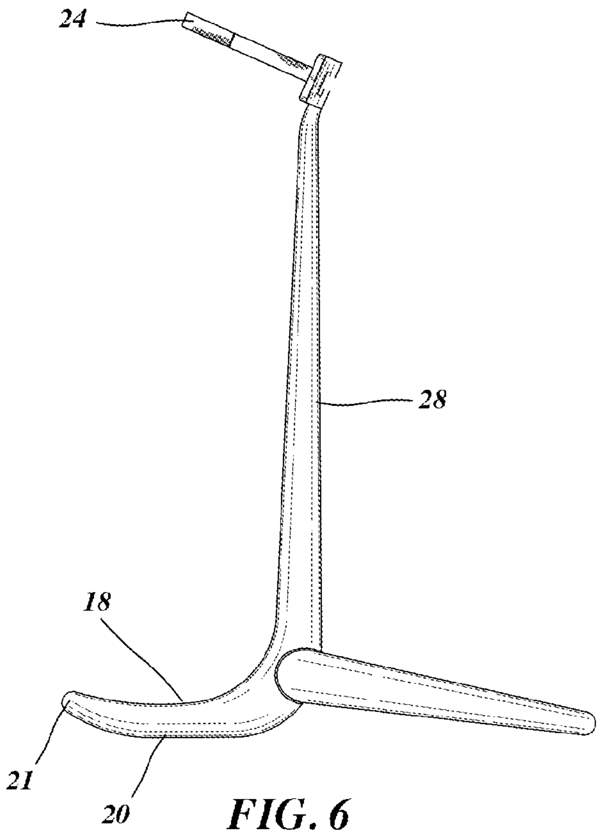
FIG. 6 is a side view of the instrument stand in accordance to one, or more embodiments.
Figure 7:
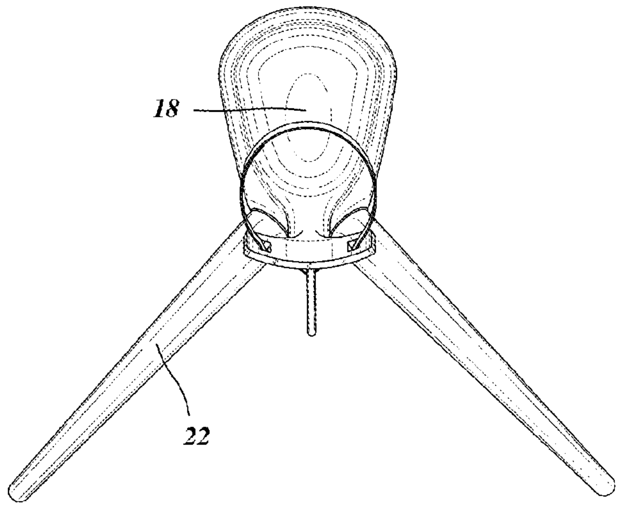
FIG. 7 is a top view of the instrument stand in accordance to one, or more embodiments.
Figure 8:
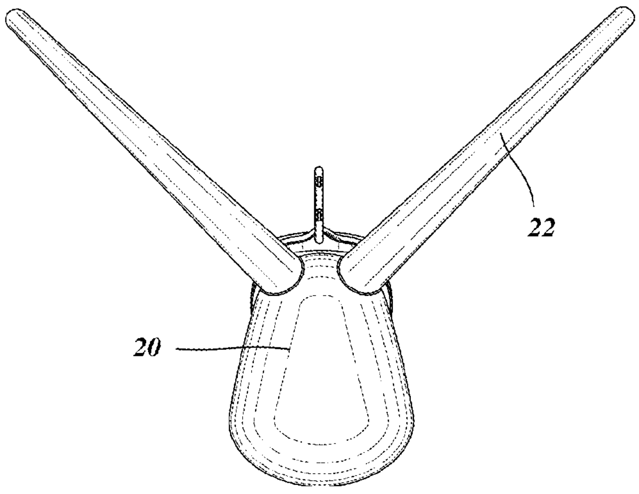
FIG. 8 is a bottom view of the instrument stand in accordance to one, or more embodiments.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Referring initially to FIGS. 1-8, an instrument stand is shown generally at 10. In embodiments, the instrument stand is shown with a saxophone 6 but the instrument stand can be used for other types of musical instruments such as, for example, brass instruments, wind instruments, or the like, and the following specification uses a saxophone 6 as an example. The instrument stand 10 can keep the musical instrument upright such as the saxophone 6 which can have a bell section 8 and a keyed section 9, wherein the bell section can transition into the keyed section at an underside 7. The instrument stand 10 can comprise a bow member 12 having a top shape 18 that can conform to the underside 7 of the saxophone 6 and a bottom shape 20 to lie flat on a surface and a bottom slope 21 that can contour to the saxophone underside 7 and bell section 8 transition. The bow member 12 can be any suitable shape or size but in the preferred embodiment the top shape 18 can conform to the underside 7 of the instrument such as, for example, an alto saxophone, a tenor saxophone, a baritone saxophone, a bass saxophone, trumpet, tuba, trombone, clarinet, oboe, or the like. The bow member 12 can be made from such as, for example, plastic, stainless steel, aluminum, carbon fiber, or the like In other embodiments, the top shape 18 can have an insert (not shown) that can be removably coupled to the top shape wherein the user can adjust the size of the top shape to fit the various sizes of the instrument's underside 7. The insert can slide into a slot or can be snapped into the top shape 18 to adjust the top shape to the various size saxophones so that the instrument stand can accommodate different types of saxophones. The bottom shape 20 can have non-slip padding or grip material coupled to it which can come into contact with the surface to enhance stability and prevent slippage which can be such as, for example, polyurethane, foam, neoprene, rubber, or the like. The bottom shape 20 can be flat to sit securely against a surface or in other embodiments the bottom shape can be any suitable shape such as, for example, flat, circular, rectangular, or the like.

In embodiments, the bow member 12 can have at least one leg 22 extending from the bow member 12 in the plane of a surface or there can be such as, for example, two legs, three legs, four legs or the like, and can be in the shape of such as, for example, v, y, or the like. The at least one leg 22 can vary in length and in size to support the different size saxophones. The at least one leg can be such as for example, circular, square, rectangular, or the like in shape. The at least one leg 22 can be made from such as, for example, plastic, stainless steel, aluminum, carbon fiber, or the like. The bow member 12 and the at least one leg 22 can be made from one piece or multiple pieces. The at least one leg 22 can be permanently coupled or removably coupled to the bow member 12 wherein the at least one leg can be removably coupled to the bow member by a leg attachment 23. The leg attachment 23 can couple the at least one leg 22 by such as, for example, threaded into the bow member, spring loaded pins, clasps, quick release mechanism or the like. The at least one leg 22 can be permanently coupled to the bow member 12 by such as, for example, fasteners, pins, rivets, or the like.

In certain embodiments, the at least one leg 22 can be telescopic or can be multiple pieces allowing one piece to retract into the other piece or into the bow member 12 or in other embodiments into a column 28. The at least one leg 22 can be secured in place when at the user's specified length by such as, for example, threaded legs and bow member, spring-loaded pins, clasps, quick-release mechanisms, or the like allowing the user to adjust the at least one leg's length allowing the at least one leg to support larger or smaller saxophone sizes.

In other embodiments, the at least one leg 22 can be removable, permanently or foldably attached to the bow member 12 and the at least one leg 22 can have a pivot joint on the bow member 12 and the at least one leg wherein the at least one leg can fold up or down into a column 28 when not in use and can fold down when the saxophone is placed on the surface. The at least one leg 22 can be on a separate plane from the surface higher up on the bow member 12 than the bottom shape 20 and can be angled down towards the surface wherein the legs can have a straight portion angled down and a flat portion that comes into contact with the surface. The flat portion of the at least one leg 22 can be non-slip padding or grip material to enhance stability and prevent slippage such as, for example, polyurethane, foam, neoprene, rubber, or the like.

In embodiments, the instrument stand 10 can comprise at least one strap 24. The at least one strap 24 can attach the top portion to the bell section 8, column 28 to the bell section and the bow member to the bottom of the bell section. The at least one strap 24 can couple the instrument stand 10 to the saxophone 6. The column 28 can extend from the bow member 12 to the strap 24. The column 28 can have a top portion 30 and a bottom portion 32 wherein the top portion can be removably or permanently attached to the strap 24 by a loop 31 which can be such as, for example, loops, holes, guides, or the like. The column can be any suitable size and thickness but in the preferred embodiment the column thickness can allow for the instrument to fit in the case without removing the instrument stand or in other embodiment thickness call can support at least one light 40.

In other embodiments, the column 28 can be adjustable in height wherein the column top portion 30 can fit into the bottom portion 32 and can be adjusted in height to adjust to the saxophone various bell size length. The column 28 can be adjustable manually by push button and plurality of holes spaced on the top portion 30 or bottom portion 32 that allows the top portion or bottom portion to extend or shorten the column length and the buttons to snap into the holes to set the length. The column 28 can be manually adjusted by the user by such as, for example, spring-loaded pins, clasps, quick-release mechanisms, or the like. The column 28 can be such as, for example, circular, square, rectangular, or the like in shape. The column 28 can be made from such as, for example, plastic, stainless steel, aluminum, carbon fiber, or the like. The column 28 can be permanently attached or removably attached to the bow member by such as, for example, weld, fasteners, rivets, pins, or the like.

In embodiments, the top portion 30 can be any suitable size and shape but in the preferred embodiment the top shape is sized to fit the bell section 8 of the saxophone 6. The top portion 30 can have a non-slip padding or grip material attached to it and can enhance the stability and prevent slippage on the saxophone wherein the material can be such as, for example, polyurethane, foam, neoprene, rubber, or the like.

The strap 24 can be such as, for example, clamps, cable tie, hook and loop tie, plastic coated ties, webbing, vinyl, ribbon, rope, or the like. The strap 24 can be coated or have a sleeve around it wherein the sleeve or coating can be a non-slip padding or grip material to enhance stability and prevent slippage such as, for example, polyurethane, foam, neoprene, rubber, or the like. The strap 24 can completely surround the bell section 9 or can partially surround the bell section wherein the strap can be substituted for by a half circular channel that can snap onto the bell section. The strap 24 can be integrated into the top portion 30 of the column 28 or can be a separate piece from the column wherein the strap can be removably attached to the top portion. The strap 24 can be adjustable to fit different bell sections diameters and sizes.

The strap 24 can have at least one hanging loop 34 which can be such as for example, a carabiner, hook, s-hook, ring, link or the like allowing the user to hang the saxophone off of another items, such as, for example a wall hook, a table, a stand, a chair, or the like. In other embodiments the strap can be omitted, and the top portion can have a u-channel that is sized to fit around the bell section 9. In certain embodiments the bow member 12, column 28 and at least one leg 22 can be one piece or multiple pieces permanently or removably coupled to each other. The bow member 12, column 28 and at least one leg 22 can be made from the same material type or can be mad from differing material types such as, for example, aluminum, plastics or composite materials. The strap 24 can be coupled to the top portion 30, the column 28 and the bow member of the saxophone or in other musical instruments the strap can be attached to similar parts of the musical instruments.

Figure 9:
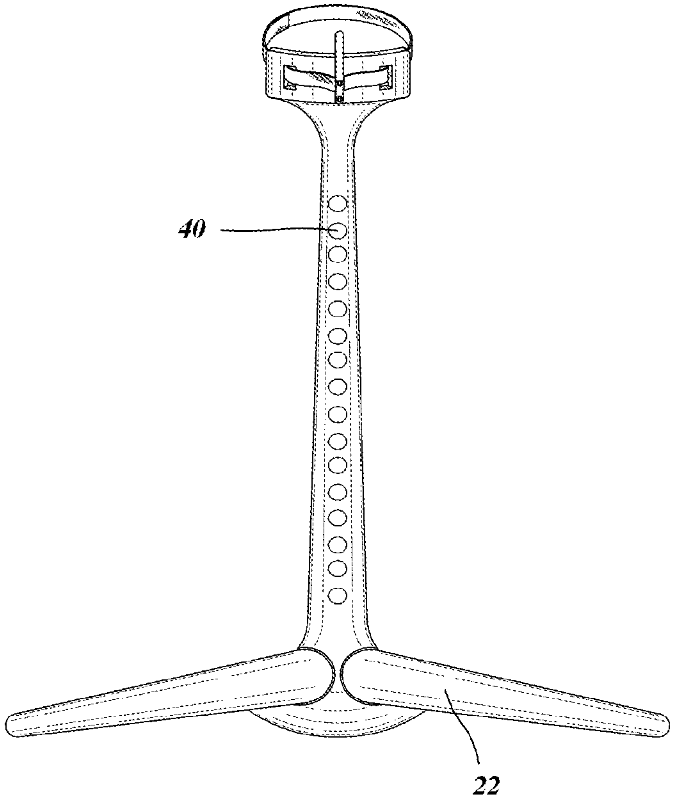
FIG. 9 is a font view of another embodiment of instrument stand in accordance to one, or more embodiments.

In other embodiments, referring to FIG. 9, the column can further comprise at least one light 40 wherein the light can be such as, for example, light emitting diodes, krypton light, fluorescent, quartz, or the like. The lights 40 can be evenly spaced in one row or multiple rows and can be evenly spaced or can be unevenly spaced. The lights 40 can be coupled to a microcontroller and a power source wherein the microcontroller can control the lights and can be coupled to a microphone. The user can set the lights 40 to a random pattern or a set pattern according to the beat of the music or can use the microphone to create the pattern for the lights or can spell the user's name on the at least on lights. The microcontroller and lights 40 can be coupled to a power source wherein the power source can be such as, for example, lithium batteries, alkaline batteries, button cell batteries, or the like. The power source can be removably coupled to the inside of the column 28 or the at least one leg 22.

In other embodiments, the at least one light 40 can be removably attached to the instrument such as, for example, the edge of the inside surface of the instrument's bell, the bell section, or the like. The at least one light 40 can be coupled to the instrument's bell by such as, for example, clips, straps, rings, hook and loop, adhesive, or the like. The at least one light 40 can be in the shape of a ring or any other suitable shape and can be sized to fit any instrument's bell size. The at least one light 40 can be coupled to a power source and microcontroller wherein the power source and microcontroller can be removable attached to the instrument by such as, for example, hook and loop, straps, adhesive, clips, or the like. In certain embodiments, the at least one light 40 can be coupled to any surface, edge or bottom section of the instrument by such as, for example, clips, straps, rings, hook and loop, adhesive, tape, or the like. Multiple users can couple the at least one lights together through a wired or wireless connection such as Bluetooth and can sync the lights together. The microcontroller can be wirelessly connected to a portable computing system wherein the user can control remotely at least one of such as, for example, light color, light intensity, light patterns, or the like.

The lights can be coupled to the column or can be coupled to the instrument by an adhesive, tape, or hook and look. The at least one light can be in a ring that goes over the instrument's inside surface of the bell or other parts of the instrument and can be tied in place with straps around the outside surface of the bell. The at least one light can comprise at least one bell light and at least one column light wherein the at least one bell light can be coupled wired or wirelessly to the at least one column light. The at least one light can be shaped to correspond to the instrument's bell, and wherein the instrument can be a saxophone, trumpet, trombone, baritone, tuba or the like. The at least one light can be shaped to correspond to the instrument's shell wherein the instrument can be a guitar, ukulele, violin, piano, or other stringed or keyboard instruments.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. An instrument stand for keeping an instrument upright having a bell and a keyed section, wherein the bell section transitions into the keyed section at an underside, the instrument stand comprising:
- a bow member having a top shape to conform to the underside of the instrument and a bottom shaped to lie flat on a surface;
- at least one leg extending from the bow member in a plane of the surface; and
- a strap configured to encircle the bell section separated from the bow member by a column.

2. The instrument stand according to claim 1, wherein the bow member has a non-slip padding or grip material to enhance stability and prevent slippage of a saxophone.

3. The instrument stand according to claim 1, wherein the at least one leg is removable from the bow member.

4. The instrument stand according to claim 1, wherein the at least one leg is removably coupled to the bow member.

5. The instrument stand according to claim 1, wherein the at least one leg is collapsible into the bow member.

6. The instrument stand according to claim 1, wherein the bow member is constructed from a lightweight and durable material, such as aluminum, plastics or composite materials.

7. The instrument stand according to claim 1, wherein the at least one leg is constructed from a lightweight and durable material, such as aluminum, plastics or composite materials.

8. The instrument stand according to claim 7, wherein the strap is coupled to the top portion of the column.

9. The instrument stand according to claim 7, wherein the bow member is coupled to the bottom portion of the column.

10. The instrument stand according to claim 1, wherein the column has a top portion and a bottom portion.

11. The instrument stand according to claim 1, wherein the column is telescopic to adjust the height of the column and locked into place by spring-loaded pins, clasps, or quick-release mechanism.

12. The instrument stand according to claim 1, wherein the at least one leg is telescopic into itself.

13. The instrument stand according to claim 1, wherein the instrument is a saxophone.

14. The instrument stand according to claim 1, wherein the bow member, column and at least one leg are one piece or multiple pieces coupled together.

15. The instrument stand according to claim 1, wherein the at least one leg has a non-slip padding or grip material to enhance stability and prevent slippage of the saxophone.

16. The instrument stand according to claim 1, wherein the strap has at least one leg has a non-slip padding or grip material to grip onto a saxophone's bell section.

17. The instrument stand according to claim 1, further comprising at least one light coupled to a microcontroller and a power source wherein the at least one light is coupled to the column or to the bell of the instrument.

18. The instrument stand according to claim 17, wherein the microprocessor and power source are coupled inside the column and/or at least one leg.

19. The instrument stand according to claim 17, wherein the lights are coupled to the column or instrument by an adhesive, tape, or hook and look.

20. The instrument stand according to claim 17, wherein the at least one light is in a ring that goes over the instrument's inside surface of the bell and tied in place with straps around the outside surface of the bell.

21. The instrument stand according to claim 17, wherein the at least one light comprises at least one bell light and at least one column light wherein the at least one bell light is coupled wired or wirelessly to the at least one column light.

22. The instrument stand according to claim 17, wherein the at least one light is shaped to correspond to the instrument's bell, and wherein the instrument is a saxophone, trumpet, trombone, baritone, or tuba.

* * * * *